Patented Oct. 20, 1925.

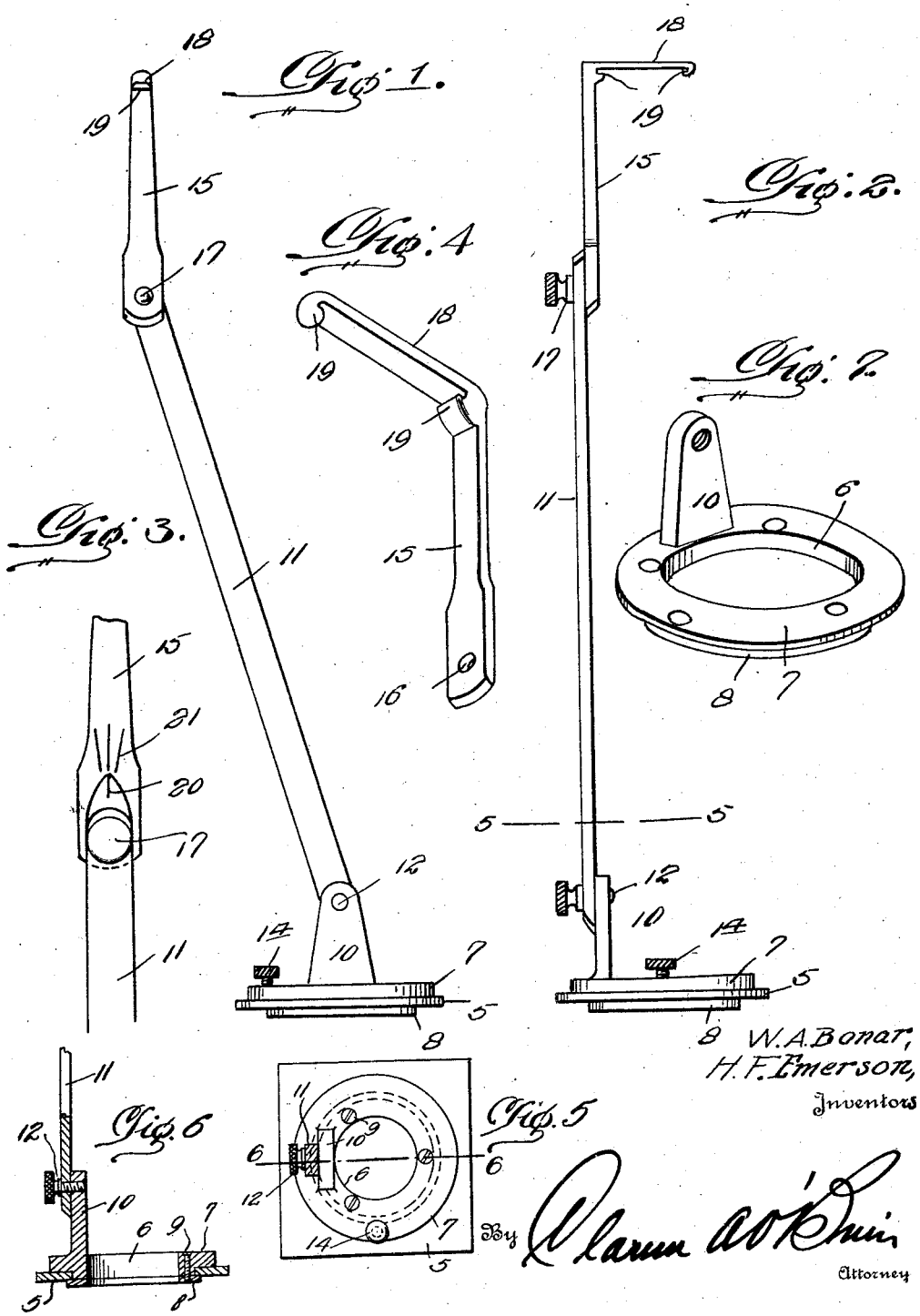

1,557,796

UNITED STATES PATENT OFFICE.

WILLIAM A. BONAR AND HOWARD F. EMERSON, OF NEVADA, MISSOURI.

DENTAL FILM SUPPORT.

Application filed November 23, 1923. Serial No. 676,632.

*To all whom it may concern:*

Be it known that we, WILLIAM A. BONAR and HOWARD F. EMERSON, citizens of the United States, residing at Nevada, in the county of Vernon and State of Missouri, have invented certain new and useful Improvements in Dental Film Supports, of which the following is a specification.

This invention relates to certain new and useful improvements in dental film supports for use in conjunction with X-ray apparatus.

Since the development of the X-ray, persons in making dental pictures have worked under a much greater handicap than in any other branch of radiography. In making a picture of any part of the body except the teeth, it is an easy matter to get the proper angle or to have the film at right angles to the central ray from the tube of the X-ray apparatus.

On the other hand, in dental work, this is somewhat a matter of guess work, and even the most experienced persons often fail to get the correct angle thus resulting in a worthless picture.

The primary object of the present invention, therefore, is to provide a dental film support, through the use of which the film is not only supported at the proper angle, but the film is held in the path of the central ray, and at the proper distance from the pocket or point in the tube where the rays originate.

Another object of the invention is to provide a dental film support of the above kind, including readily removable film holders whereby the parts which come in contact with the patient's mouth, may be detached for the purpose of sterilizing the same from time to time.

Still another object of the invention is to provide a dental film support including a film holder carrying stick, and means for mounting said stick so as to extend substantially parallel with the central rays at one side of the latter, and whereby said stick may be bodily moved in a circular path to different points about or at different sides of the central rays, whereby the film holder will be properly positioned for holding the film in any desired part of the mouth.

Still another object of the invention is to permit adjustment of the film holder carrying stick to any desired side of the central rays in a simple and expeditious manner and through the use of a simple and durable construction whereby the invention will meet with all of the requirements for a successful commercial use.

With the above general objects in view, and others that will become apparent as the nature of the invention is better understood, the same consists in the novel form, combination, and arrangement of parts hereinafter more fully described, shown in the accompanying drawings and claimed.

In the drawings, wherein like reference characters indicate corresponding parts throughout the several views:

Figure 1 is an inside elevational view of a dental film support constructed in accordance with the present invention.

Figure 2 is a side elevational view of the device shown in Figure 1.

Figure 3 is an enlarged fragmentary elevational view showing an outside elevational view of the connection between the film holder and the supporting stick therefor.

Fig. 4 is a perspective view of the film holder shown in the device as disclosed in Fig. 1.

Figure 5 is an enlarged transverse sectional view, taken substantially upon the line 5—5 of Figure 2.

Figure 6 is a substantially central transverse sectional view, taken substantially upon the line 6—6 of Figure 5.

Figure 7 is a perspective view of the revoluble collar.

Most X-ray machines make use of a lead cone to concentrate the rays and cut out the rays not needed. These cones are attached to the tube carriage in various ways, usually by means of a stationary flat plate, and our device includes a plate 5 preferably of rectangular form in plan, as shown in Figures 5 and 6, that is exactly like the plates on these cones and that is adapted to be attached to the tube carriage to be stationary with regard to said carriage, in the usual manner. The plate 5 is provided with a relatively large central opening of circular form, through which the central rays from the tube pass, parallel to the axes of said opening, and in accordance with the present invention, a collar 6 is revolubly fitted in the opening of the plate 5. This collar 6 is retained in place by means of an integral flange 7 upon one end thereof engaging one face of the plate 5 adjacent its opening, and a removable flange 8 at the other end of the collar engaging the opposite face of the plate 5 adjacent its opening. The flange 8 may be secured to the collar 6 by means of bolts 9 whose heads are countersunk in the collar adjacent the flange 7, and whose stems are threaded into threaded openings in the flange 8 as shown clearly in Figures 5 and 6.

Rigid with and projecting outwardly from the collar 6 is an apertured arm or ear 10 that is positioned at one side of the opening in the collar 6 and that extends in a direction parallel with the axis of said opening. This arm or ear 10 has the wall of its opening threaded, and said opening is adapted to be aligned with an opening in the inner end of a supporting bar or stick 11, the inner end of said bar or stick 11 being disposed against the outer side of the arm 10 and frictionally held into engagement therewith by means of a screw 12 that is passed through the opening in the stick 11 and threaded into the opening in the arm 10.

A set screw 14 is threaded thru the flange 7 of the collar 6, so that its inner end is positioned to impinge against the outer face of the plate 5 for releasably retaining the collar 6 in any desired position to which it may be revolved.

Clamped and pivoted to the outer end of the bar or stick 11 is a film holder including an arm 15, whose inner end is disposed flatly against the inner surface of the other end of the bar or stick 11 and is formed with a transverse screw threaded aperture 16 adapted to be transversely aligned with an opening provided transversely of and in the outer end of the stick or bar 11. A bolt 17 passes through the opening in the outer end of the bar or stick 11 and is threaded into the opening 16 of the film holder arm 15 so as to pivotally secure the film holder to said stick or bar 11 and to maintain the film holder in any desired stepped angular relation to said bar or stick 11. The film holder further includes an inwardly and transversely extending film retaining plate 18 that is rigid with the outer end of the arm 15, and that has lips 19 at the opposite ends thereof, under which opposite edges of the film are engaged in the usual manner. The film holder will be made in various sizes to accommodate the various standard sized films, and as shown in Figures 1, 2, and 8, the film retaining plate 18 is very narrow. This is for use in obtaining X-ray photographs of the incisor, canine, and if so desired by the operator, the bicuspid teeth. It is apparent that by removing the screw 17, these film holders may be detached for the purpose of sterilizing the same after they come in contact with the patient's mouth.

In order that the film holder may be readily adjusted to the proper and desired predetermined angle relative to the rod or stick 11 in an expeditious manner, the outer end of said rod or stick 11 is provided with a central indicating mark 20 that cooperates with an arcuate series of graduations 21 provided on the outer surface of the inner end portion of the arm 15 of said film holder.

In other types of dental machines, there is no cone attachment, but the lead glass case which encloses the tube is cylindrical on one side or in the form of a short tube. On machines of this type, a metal collar may be placed around this cylindrical part of the case, and to which collar the stationary piece or plate 5 may be secured.

The distance of the film from the target for dental work is 18 inches and the length of the rod or stick 11 of the device will vary in proportion to the variations in distance from the target to the attachment of the present device on the tube carriage.

From the foregoing description, it is believed that the construction and operation as well as the advantages of the present invention will be at once apparent and appreciated by those skilled in the art. However, the manner of use and operation may be briefly outlined as follows:

The film is engaged beneath the lip 19 of the film holder, after which the set screw 14 is loosened for permitting the collar 6 to be revolved, so as to remove the parts carried thereby to a proper position wherein the film holding plate 18 or 18ª is properly positioned behind the particular teeth being operated upon. The set screw 14 is then tightened so as to hold the parts in their adjusted positions, and the film will be held in line with the central rays passing axially thru the opening in the collar 6 and plate 5. This operation is had with the arm 10, rod or stick 11, and arm 15 in alignment with each other when suitable, but should the operator be unable to properly position the plate when these parts are so related, their angular positions may by changed by loosening the set screws 12 and 17 and then again tightening the latter after the desired angular relation between the parts has been effected. The exact relation or angular position of these parts relative to each other will be accurately indicated by the parts 12 and 20 and the cooperating dash plates 13 and 21 thereof, so that a record may be made of the same for producing a duplicate photograph at a later period to note any changes that have taken place. It is noted that the rod or stick 11 is movable in opposite directions in a plane parallel with the plane in which the film holder is movable in opposite directions, while the rod or stick and film holder are partly movable with the collar in a circular path about the axis of the collar 6 or about the central rays passing therethrough. This will furnish every adjustment desired in a simple and expeditious manner, and through the use of a simple, compact, durable and cheap construction.

Having thus described our invention, what we claim as new is:

A dental film support comprising a plate having a circular opening, a collar rotatably mounted in said opening and having at one end a flange which bears against one face of the plate, a flange applied to the other end of the collar and bearing against the opposite face of the plate, means for drawing said flanges in frictional contact with the surfaces of the plate, an ear mounted upon the first mentioned flange, a bar adjustably connected with the ear, and an arm adapted to retain a film and pivotally and adjustably connected with the free end of said bar.

In testimony whereof we affix our signatures.

WILLIAM A. BONAR.
HOWARD F. EMERSON.